June 2, 1964 S. L. DOLCE 3,135,956
RADIO NAVIGATION APPARATUS
Filed June 8, 1962 10 Sheets-Sheet 6

INVENTOR.
SAMUEL L. DOLCE
BY *Roy M. Pitts*
ATTORNEY

June 2, 1964

S. L. DOLCE 3,135,956

RADIO NAVIGATION APPARATUS

Filed June 8, 1962

INVENTOR.
SAMUEL L. DOLCE

BY *Rolyn Pitts*

ATTORNEY

United States Patent Office 3,135,956
Patented June 2, 1964

3,135,956
RADIO NAVIGATION APPARATUS
Samuel L. Dolce, La Habra, Calif., assignor to
North American Aviation, Inc.
Filed June 8, 1962, Ser. No. 201,057
11 Claims. (Cl. 343—8)

This invention relates to a radio navigation system, and more particularly to a non-coherent pulsed Doppler navigation system.

The art of navigation ssytems for aircraft and other vehicles has developed radio navigational systems, certain elements of which are external to the vehicle, such as radio beacon navigation systems which rely upon the operation and known location of radio beacons or transponders placed in predetermined relationship to the intended course of the vehicle. Self-contained navigation systems have been sought, which do not rely upon the operation and accurate positioning of external elements such as becons.

In the development of self-contained navigation systems, self-contained radio systems have been employed, using the Doppler principle whereby the direction of a maximum shift in frequency (Doppler shift) in received reflections of transmitted energy indicates the direction of the vehicle velocity vector, the extent of the Doppler shift being indicative of the vehicle scalar velocity. The advantages of such systems are that the scaler velocity and directional information regarding the velocity vector is determined relative to the ground or terrestrial reference. However, the means by which such systems have been mechanized in the prior art have several inherent limitations and disadvantages.

The conventional Doppler radar navigation systems, representative of the so called "Janus concept," employ four mutually spaced antennas, a first Doppler receiver connected to compare the received frequencies of a forward-looking pair and an aft-looking pair of said antennas, and a second Doppler receiver connected to compare the received frequencies of a left pair and a right pair of said antennas. In this way, Doppler velocity information parallel to and transverse of the vehicle reference line formed by the antenna array is thus provided. A computer resolver element is further employed to operate on the two data sets to generate two additional data sets, namely, the magnitude and the direction of the vehicle velocity vector.

Such a system is cumbersome and expensive, requiring a plurality of antenna and receivers and related signal processing equipment. Also the satisfactory operation of such a system requires that each of the antennas of the array be maintained in a proper orientation relative to the others and to the vehicle forward reference line. Further, because a plurality of receiver sets are employed, each receiver set must be maintained in careful adjustment relative to the other in order to provide accurate signals, particularly drift angle data.

Another disadvantage inherent in Janus-type Doppler radar navigation systems is the dependence of the accuracy of such systems upon the back-scattering coefficients of the terrain viewed by each antenna. For example, if an aircraft employing such a system were fiying over and parallel to a shoreline (e.g., the sea on one hand, and land on the other), the difference in the back-scattering coefficients of the sea on one hand and the land on the other would bias or adversely affect the computation of vehicle ground speed and direction.

The device of the subject invention is a non-coherent pulsed Doppler system comprising a pulsed transmitter, a single common downward-looking directional antenna, azimuth antenna scanning means, and a single receiver. At least one pair of filters are responsively coupled to the receiver for distinguishing at least two mutually distinct frequencies contained within the output of the receiver. A null detector is responsively connected to each of the filters to provide a signal indicative of a null difference between the outputs of the filters. Adjustable gain means is connected in series with one of the filters, and is responsively connected to the antenna scanning means for maintaining the gain of said one filter in predetermined relation to the other.

There is provided a signal generator responsively connected to the antenna scanning means for providing a signal indicative of antenna look angle. There are also provided first and second signal storage means responsively connected to the function generator means for storing the signals therefrom. There is further provided left and right logic gating means responsively connected to the null detector and the antenna scanning means for allowing an input from the signal generator to said first and second storage means respectively during intervals of null signals from the null detector only when the antenna is scanning to the left and right respectively of the azimuth reference plane. Comparison means is responsively connected to the storage means for providing a signal indicative of the difference between the signals stored therein. The output of the comparison means is operatively connected to a first indicator to provide an indication of a drift angle. A second indicator is responsively connected to one of the storage means to provide an indication of velocity magnitude.

In normal operation of the described device, the antenna is made to scan in azimuth at a frequency much less than that of the pulse repetition rate of the pulsed transmitter, the null detector providing an output signal during the intervals when the inputs thereto (e.g., from the receiver filters) are of a common amplitude (e.g., a null difference in amplitude). The null detector and logic-gating means cooperate to allow the first and second storage means to store signals from the function generator output during null intervals when the antenna is to the left and right respectively of the azimuth reference plane. The average output from one of the storage means averaged over at least one antenna scanning cycle, provides a signal indicative of Doppler velocity. The averaged output from the comparison of the signals stored in the time storage means, averaged over at least an antenna scanning cycle, provides a signal indicative of drift angle or a vehicle course line relative to vehicle heading.

Hence, it is to be seen that the device of the invention employs only a single common scanning antenna and receiver, rather than a plurality of fixed antennas and associated receivers. Further, because only a single antenna is employed in connection with the signal-nulling process, the performance of the system is relatively independent of the backscattering coefficient of the reflecting terrain.

Accordingly, it is an object of this invention to provide an improved Doppler navigation aid employing only the non-coherent spectra of a single scanning antenna.

It is another object of this invention to provide improved Doppler navigation means the accuracy of which is not limited by the backscattering coefficients of the reflecting terrain.

It is yet another object of this invention to provide improved Doppler navigation means of minimum weight, and minimum cost.

It is a further object of this invention to provide an improved Doppler navigation means having increased simplicity and improved reliability, being easier to manufacture and to adjust.

It is yet a further object of the invention to provide a radio navigation aid employing at least a pair of mutually exclusive frequency components comprising the spectra of a single received beam of radiant energy.

These and other objects of the invention will become apparent from the following description taken in connection with the accompanying drawings in which:

FIG. 11 is a functional schematic of an alternate embodiment of one aspect of the device of FIG. 9.

In the drawings like reference characters refer to like parts.

Figure 1:
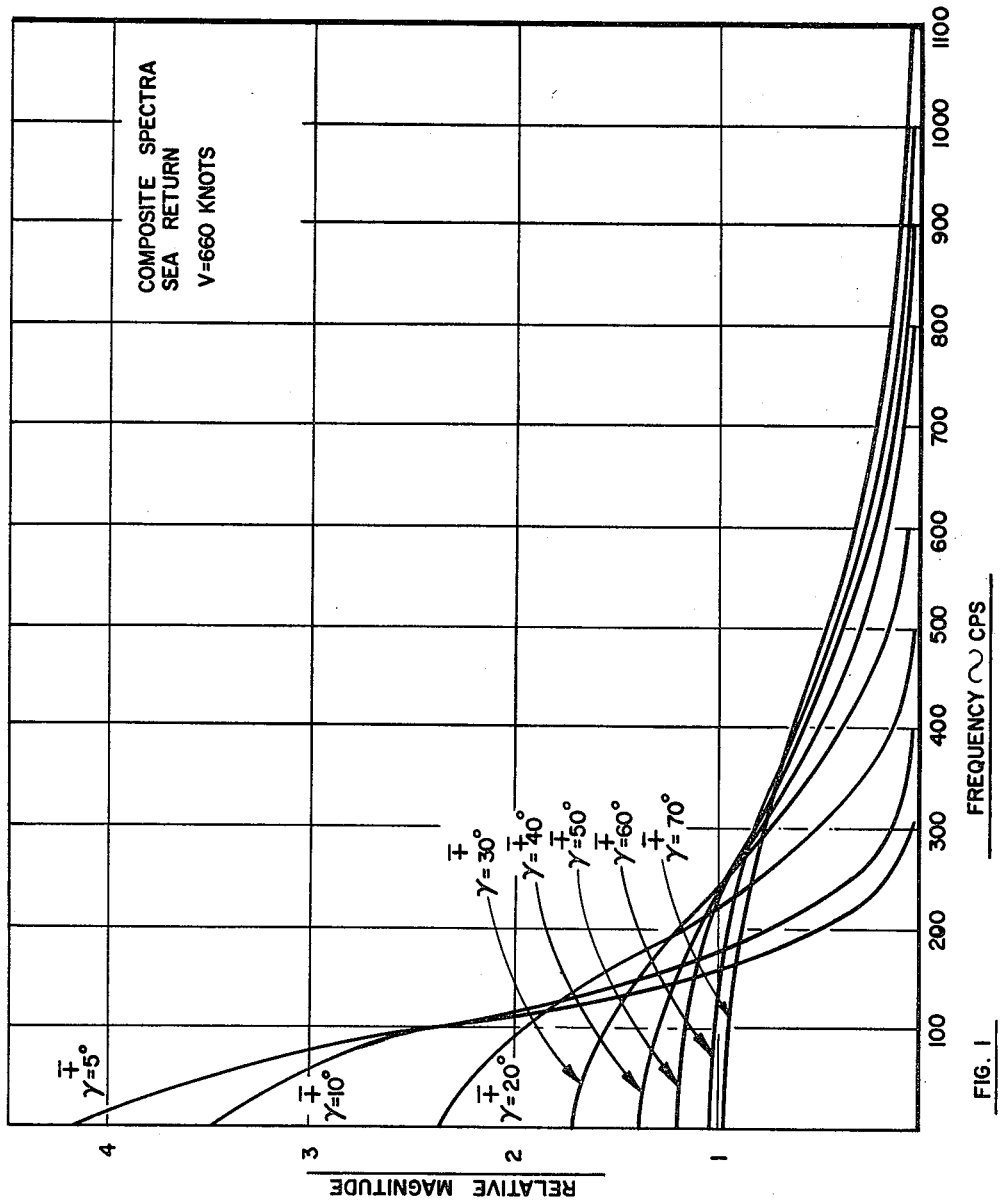
FIG. 1 is a diagram of a family of curves of composite clutter spectral power distribution plotted versus clutter frequency for several values of antenna look angle for a vehicle velocity of 660 knots.

In an azimuth scanning antenna system, the instantaneous scan angle of the antenna relative to an azimuth reference plane fixed relative to the vehicle employing such system is defined herein as the antenna look-angle $\gamma$.

The term clutter is defined herein to describe signals reflected from such objects as rain, "chaff," vegetation and the surface of the sea. Unlike noise (which is defined in the art as uncorrelated with time), clutter is correlated during a number of consecutive received pulses. The mathematical description of such clutter spectra is defined as the spectrum spread or frequency difference between the reflections of a beam of energy from a large number of independent and independently-moving scattering centers which lie within the beam width of such energy, and which have a random magnitude and phase.

Such composite clutter spectra may be observed in a single beam of received reflections as occurring, for example, in the output from a single directional antenna and receiver combination.

In a study of such composite clutter spectra as a function of vehicle velocity, it has been discovered that the amplitude excursions of single frequency components within the spectra vary as a further function of antenna look-angle $\gamma$.

Considering only two point scatterers, separated in time and space, it is possible for the echoes from each to reach the receiver simultaneously, due to the finite beam width of the antenna, and the pulse width of the pulsed transmitted energy. However, the Doppler shift produced by each such source need not be of the same magnitude, nor even of the same direction (e.g., the direction of propagation relative to each may not be coincident with the beam center of the antenna, as well as not being coincident with each other). Accordingly, two reflected waves of different frequencies are added at the receiver, producing a resultant signal whose magnitude will fluctuate at the beat or differential frequency between them. With the beam center serving as a velocity reference, a spread of velocity signals is obtained. The rate of fluctuation of the received reflections of the pulsed radar signals depends upon beam width, pulse length, azimuth angle between the beam and the velocity vector of the antenna (e.g., the vehicle), and the beam depression angle. It is to be carefully noted that the fluctuation rate is not the Doppler frequency associated with the beam center, but is rather approximately the differential or beat frequency between the rays within the beam. Of course, the scatterers within the beam width during a pulse width time interval are not limited to two point-source scatterers, but comprise many point-source scatterers, the signals from all the scatterers producing a component signal, and the frequencies of all the scatterers beating together at the receiver forming the frequency spectrum of the composite clutter signal.

While platform angular motion and antenna scanning in an antenna scanning system contribute to the clutter spectra, the frequencies and amplitudes of such contributions have been shown to produce a negligible effect upon the clutter spectra of interest.

The variation of clutter spectra with aircraft velocity as a function of antenna look-angle is shown in FIGS. 1, 2, 3, and 4.

Figure 2:
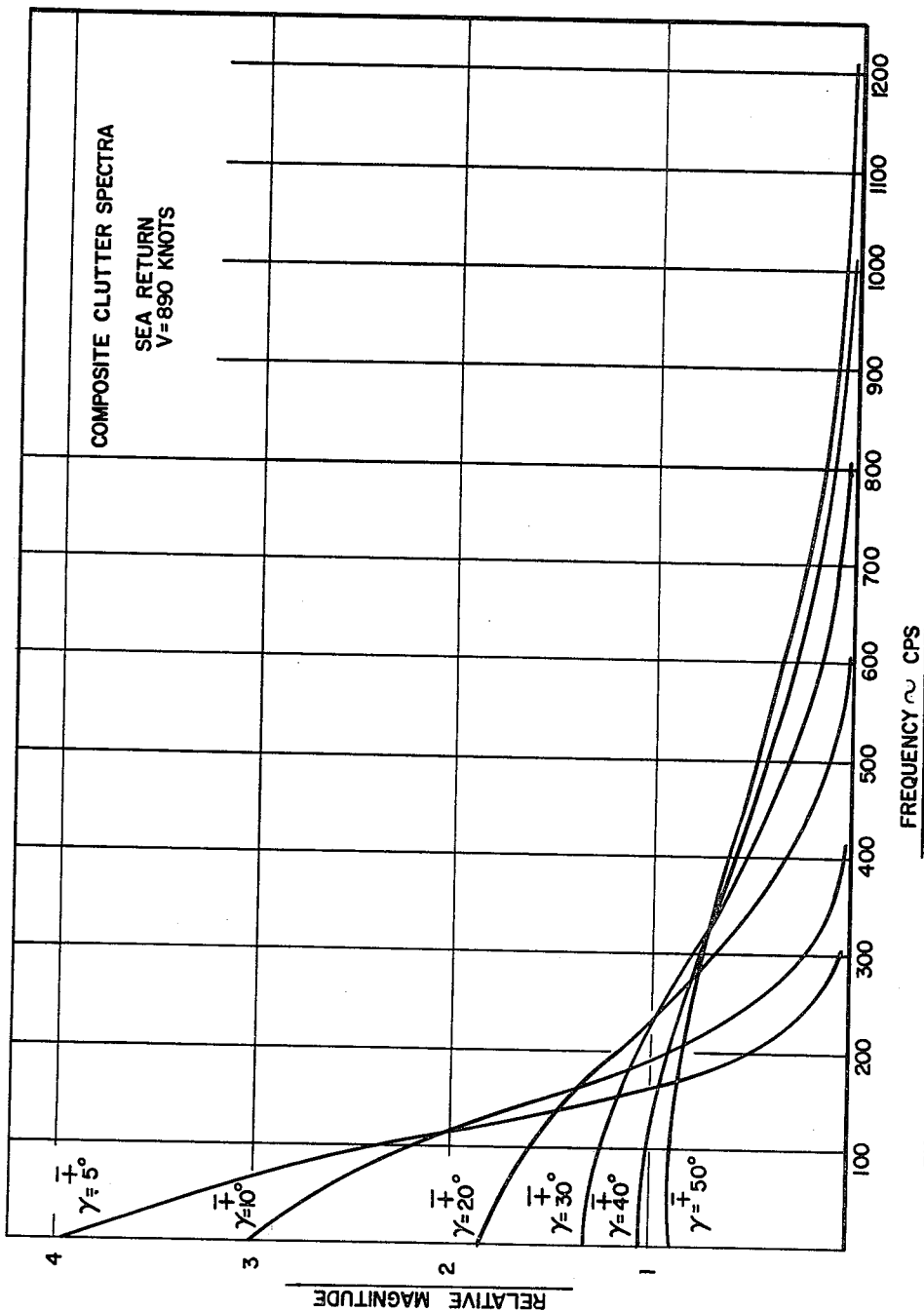
FIG. 2 is a diagram of a family of curves of composite clutter spectral power distribution plotted versus clutter frequency for several values of antenna look angle for a vehicle velocity of 890 knots.

Referring to FIGS. 1 and 2, there are illustrated diagrams of a family of curves of composite clutter spectral power distribution plotted versus clutter frequency for several values of antenna look-angle, showing the effect of look-angle upon the frequency distribution of such power spectra for a given aircraft velocity of 660 knots and 890 knots, respectively.

Figure 3:
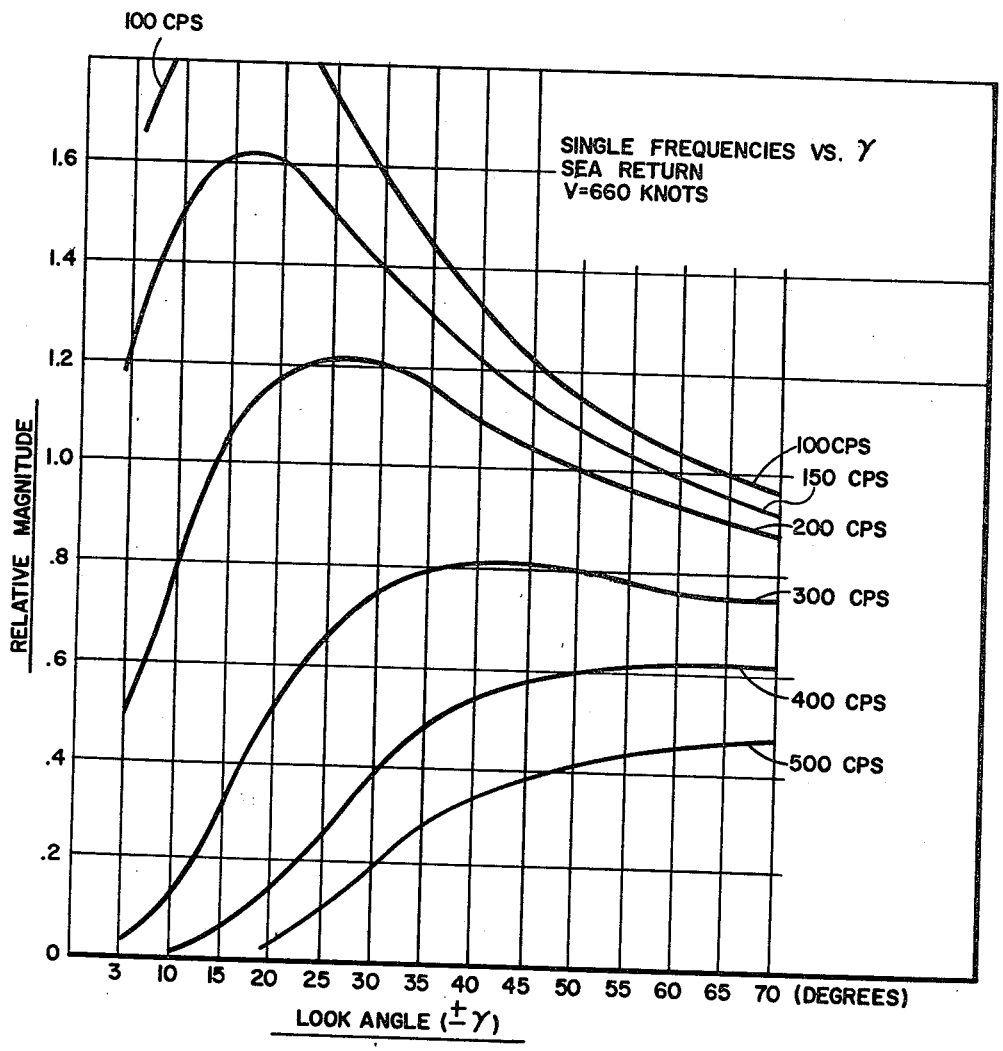
FIG. 3 is a diagram of a family of curves of the amplitude excursion of a single frequency spectral component plotted versus look-angle for several values of clutter frequency for a vehicle velocity of 660 knots.
Figure 4:
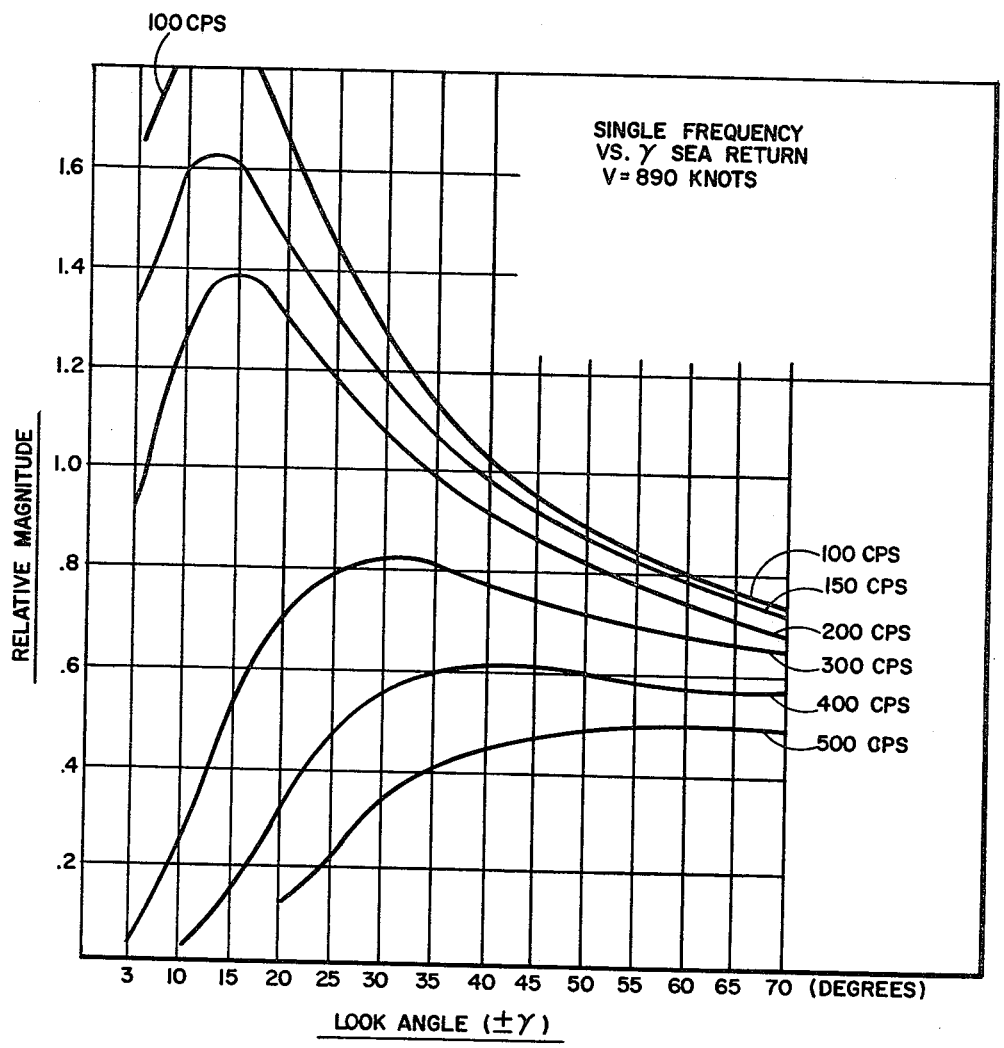
FIG. 4 is a diagram of a family of curves of the amplitude excursion of a single frequency spectral component plotted versus look-angle for several values of clutter frequency for a vehicle velocity of 890 knots.

Referring to FIGS. 3 and 4, there are illustrated diagrams of a family of curves of the amplitude excursion of a single frequency spectral component plotted versus antenna look-angle for several values of clutter frequency, showing the variation in the slope of amplitude excursion as a function of clutter frequency for a given aircraft velocity of 660 knots and 890 knots, respectively. Each of FIGS. 3 and 4 is obtained by cross-plotting the data of FIGS. 1 and 2, respectively.

The plus and minus (+ and −) notations affixed to the look-angle reference character $\gamma$, indicate that for a zero drift angle or forward velocity vector the data would be the same for look-angles of either sense (e.g., look-angles either to the right or left of the vehicle heading).

It is evident from the above figures that the peak amplitude excursion of a single frequency spectral component shifts to a smaller look-angle with increasing velocity; and, further, that the slopes of the amplitude excursion curves increase with increasing velocity.

Further, FIGS. 3 and 4 indicate that, over a range of look-angles (say, 25° to 45°, for example), the lower frequencies (up to 200 c.p.s.) demonstrate a negative slope of amplitude excursion with look-angle, while the higher frequencies (400 to 500 c.p.s.) demonstrate a positive slope. Because of the slope characteristics of the higher and lower frequencies, a two-frequency comparison technique may be employed to compute vehicle velocity and drift angle. Such technique involves the amplitude comparison of a high frequency spectral component and low frequency spectral component for a given velocity and determining the left and right antenna look-angles ($\gamma_{nL}$ and $\gamma_{nR}$) at which the amplitudes of the pair of single frequency spectral components are coincident. The magnitude of such common or coincident amplitude is indicative of the vehicle velocity, while the difference between such look-angles is indicative of the vehicle drift angle $$\delta = \frac{\gamma_{n_L} - \gamma_{n_R}}{2}$$

Figure 5:
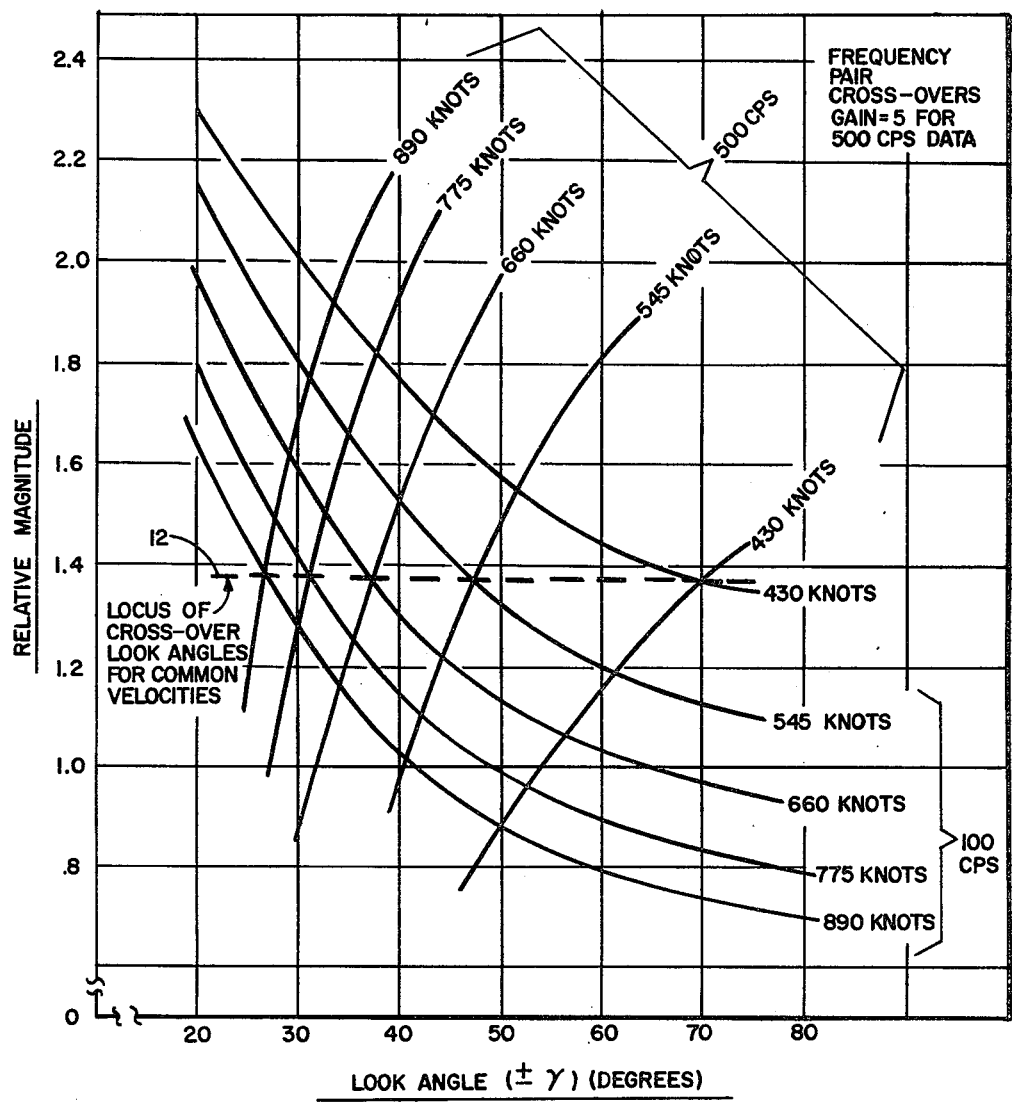
FIG. 5 is a diagram of a family of curves of amplitude excursions of a pair of mutually exclusive single frequency spectral components, having frequencies of 100 c.p.s. and 500 c.p.s. respectively, plotted versus antenna look-angle for several values of velocity, the gain of the 500 c.p.s. data having been increased by 5 units per unit.

Such technique, however, requires that the gain of the high frequency data be increased or, correspondingly, that the gain of the low frequency data be reduced, to achieve such coincidence at a common look-angle for a given velocity, as is shown in FIG. 5.

Referring to FIG. 5, there is illustrated a diagram of a family of amplitude excursions of a pair of mutually exclusive single frequency spectral components, having frequencies of 100 c.p.s. and 500 c.p.s. respectively, plotted versus antenna look-angle for several values of velocity, the gain of the 500 c.p.s. data having been increased by 5 units/unit. The gain or ratio, by which the amplitude of the high frequency data was increased, was selected to provide a cross-over of the 500 c.p.s. and 100 c.p.s. data. In other words, the 100 c.p.s. data and the gain-modified 500 c.p.s. data for a particular common velocity demonstrate a common amplitude at a particular value of look-angle $\gamma_n$. Curve 12 represents a locus of such cross-over points. The locus of velocities associated with such cross-over look-angles is also shown in FIG. 6.

Figure 6:
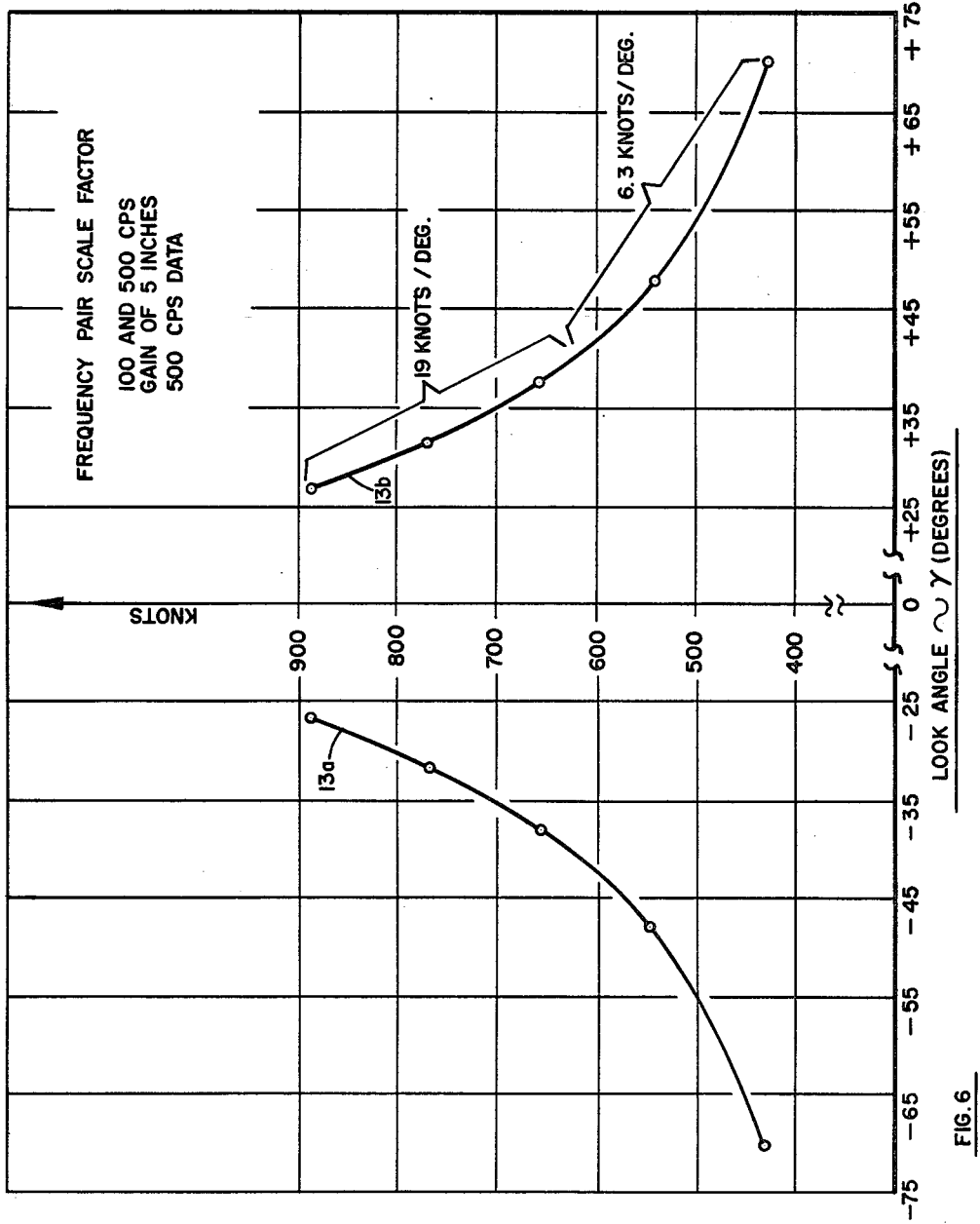
FIG. 6 is a graph of antenna look-angle $\gamma$ plotted versus velocity V for the 100 c.p.s. and 500 c.p.s. data of FIG. 5, illustrating the nonlinear relationship associated with a fixed gain ratio.

Referring to FIG. 6, there is illustrated a diagram of cross-over velocities plotted versus the cross-over look-angles $\gamma_n$ for the 500 c.p.s. and 100 c.p.s. data of FIG. 5. In other words, curves 13a and 13b of FIG. 6 indicated by the points plotted was obtained by cross-plotting the cross-over velocities of FIG. 5 versus the look-angles at which such cross-over occurs in FIG. 5. The resulting curve of cross-over velocity versus cross-over look-angle is seen to be a non-linear curve for the fixed gain of 5 units per unit of the 500 c.p.s. data relative to the 100 c.p.s. data. Such curve could be made linear by employing a non-linear gain relationship between the 500 c.p.s. data of FIG. 5 relative to the 100 c.p.s. data as a function of look-angle rather than the fixed gain relationship illustrated. Such linear curve of velocity versus look-angle is illustrated by curves 14a and 14b in FIG. 7. The non-linear gain relationship required to obtain such linear curve is shown in FIG. 8.

Figure 7:
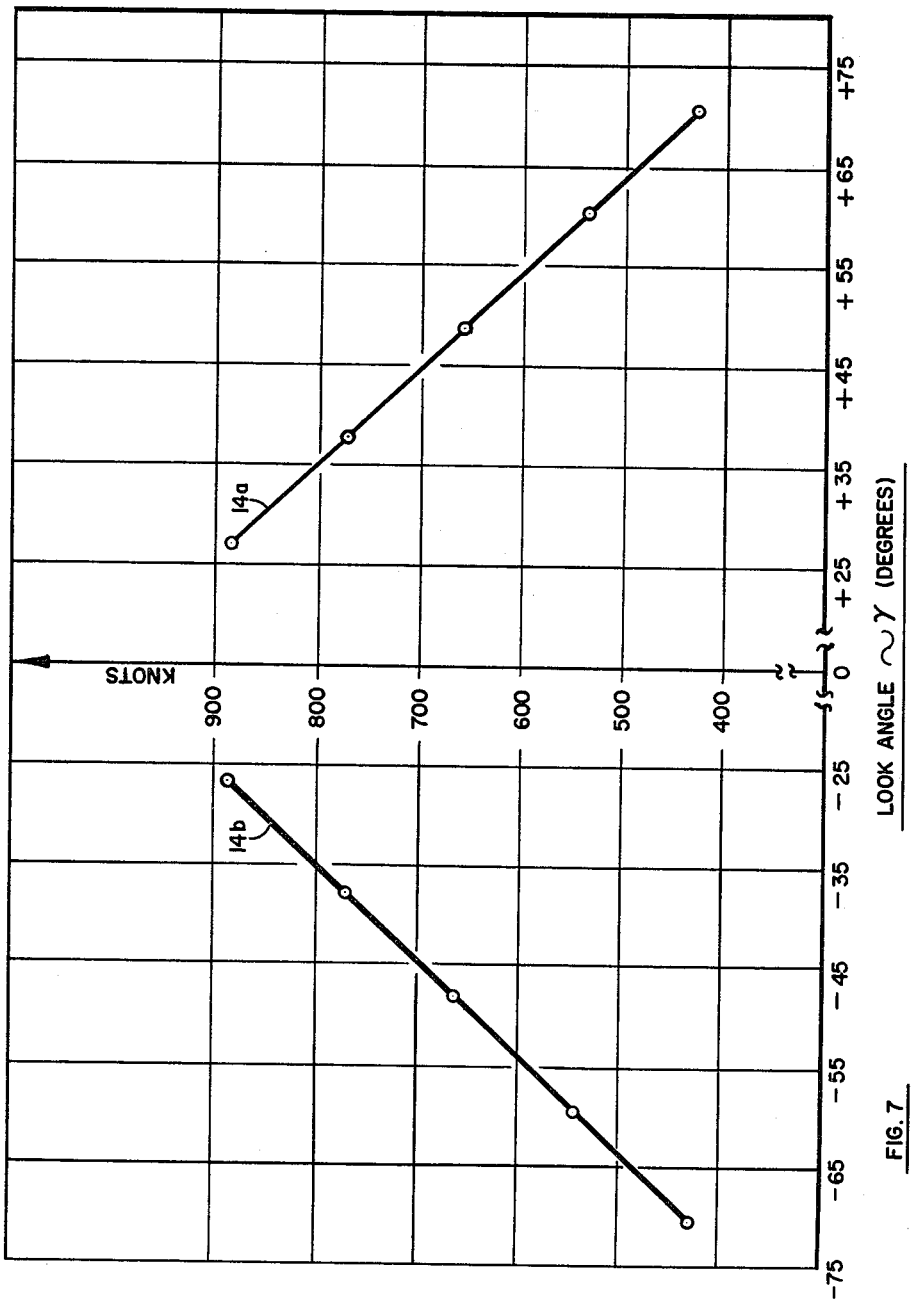
FIG. 7 is a graph of antenna look-angle $\gamma$ plotted versus velocity V, illustrating a desired linearization of the data of FIG. 6.
Figure 8:
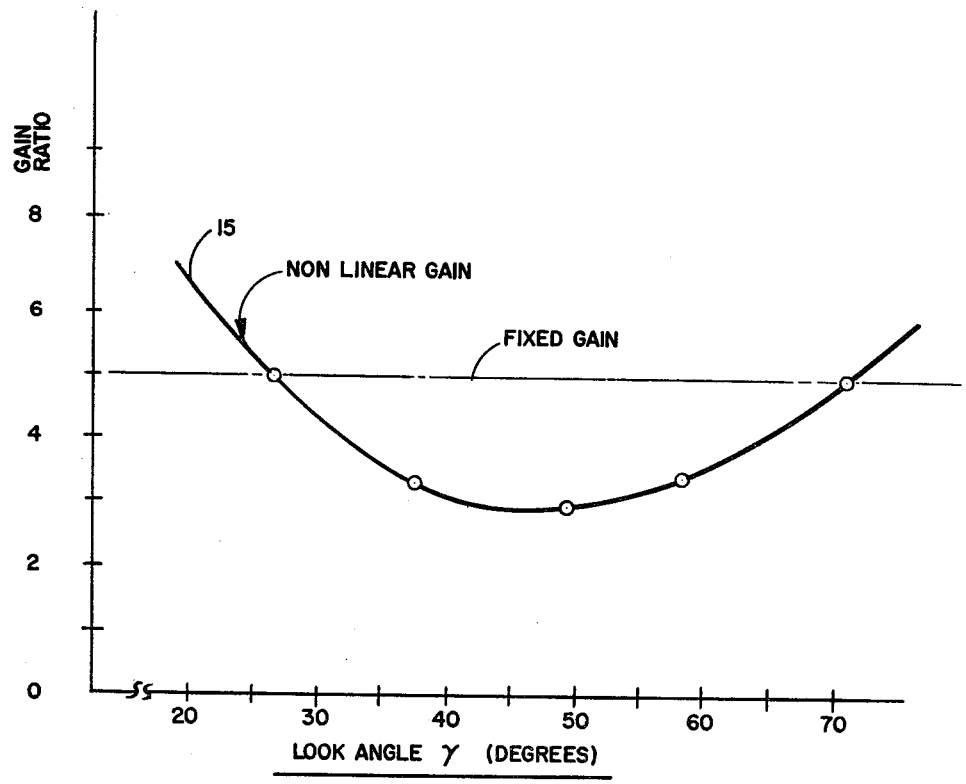
FIG. 8 is a graph of the required non-linear gain ratio plotted versus look-angle, necessary to obtain the response illustrated in FIG. 7.

Referring to FIG. 8 there is illustrated a curve 15 representing the non-linear gain relationship required between the 500 c.p.s. data and the 100 c.p.s. data of FIG. 5 in order to achieve linear curves 14a and 14b of FIG. 7. Such non-linear function may be determined by the steps of (1) determining the look-angle for a point on straight line 14a or 14b of FIG. 6, corresponding to a plotted point on curve 13a or 13b of FIG. 7 for a common velocity for which a pair of data sets exists on FIG. 5, (2) determine the gain ratio existing between such data set at that look-angle, and (3) apply the gain ratio to the fixed gain ratio (e.g., 5 units per unit) employed to find the new gain ratio for such look-angle value. For example, for the data point on curve 13a of FIG. 6 for 775 knots (at a cross-over look-angle $\gamma_n = 33$ degrees) there is a corresponding velocity data point on straight line 14b in FIG. 7 having a cross-over look-angle of 37½ degrees. Examining the pair of 775 knot data for look-angle 37½ degrees on FIG. 5, it is observed that the relative magnitude of the 500 and 100 c.p.s. data is 1.8 and 1.2, respectively, representing a gain ratio of 1.8/1.2 = 1.5. In other words, for the gain ratio employed (e.g., 500 c.p.s. data relative gain of 5, relative to the 100 c.p.s. data) the magnitude of 500 c.p.s. data point for a desired cross-over look-angle of 37½ degrees is 1.5 times too great. Hence, if the gain of the 500 c.p.s. data were reduced to a factor of 5/1.5 or 3.33 units per unit, then the desired cross-over of the 775 knot data at a look-angle of 37½ degrees would be made to occur. A similar determination of the required gain for each of a number of look-angles provides the necessary non-linear gain as a function of look-angle, associated for the straight line curves of FIG. 7. The slope of such curves and the associated gain function are exemplary only, any desired slope being obtainable from a suitable non-linear gain function by means of the method described above.

It is to be appreciated that the data of each of FIGS. 1-6 assumes that the reference line of the antenna (look-angle $\gamma = 0$) is parallel to the velocity vector. If such is not the case (e.g., a lack of angular coincidence between that component of the velocity vector lying in the plane of the look-angle and the look-angle itself), the cross-over look-angle $\gamma_{n_R}$ for a given frequency pair for scanning to the right of the antenna reference line will not be the same as the cross-over look-angle $\gamma_{n_L}$ for scanning to the left of the antenna reference line. Each of the observed antenna cross-over angles will differ from the theoretical cross-over angle by an amount equal to the drift angle $\delta$, representing the angular difference between the antenna forward reference line (FRL) and the projected velocity vector projected in the plane of the antenna look-angle $\gamma$. Hence, the drift angle may be determined from measuring, storing, and comparing the left and right cross-over look-angles, $\gamma'_{n_L}$ and $\gamma'_{n_R}$ measured relative to the antenna FRL:

$$\delta = \frac{\gamma'_{n_R} - \gamma'_{n_L}}{2} \quad (1)$$

Further, if the antenna scanning system reference (FRL) can itself be referenced to the drift angle, then the resulting like values of left and right cross-over angles $\gamma_{n_L}$ and $\gamma_{n_R}$, measured relative to the drift angle reference, ($\gamma_{n_L} = \gamma'_{n_L} + \delta$ and $\gamma_{n_R} = \gamma'_{n_R} - \delta$) can be employed to determine the craft velocity V, from a mechanization of the relationship $V = f(\gamma_n)$ illustrated in FIG. 6. A system employing such concepts is shown in FIG. 9.

Figure 9:
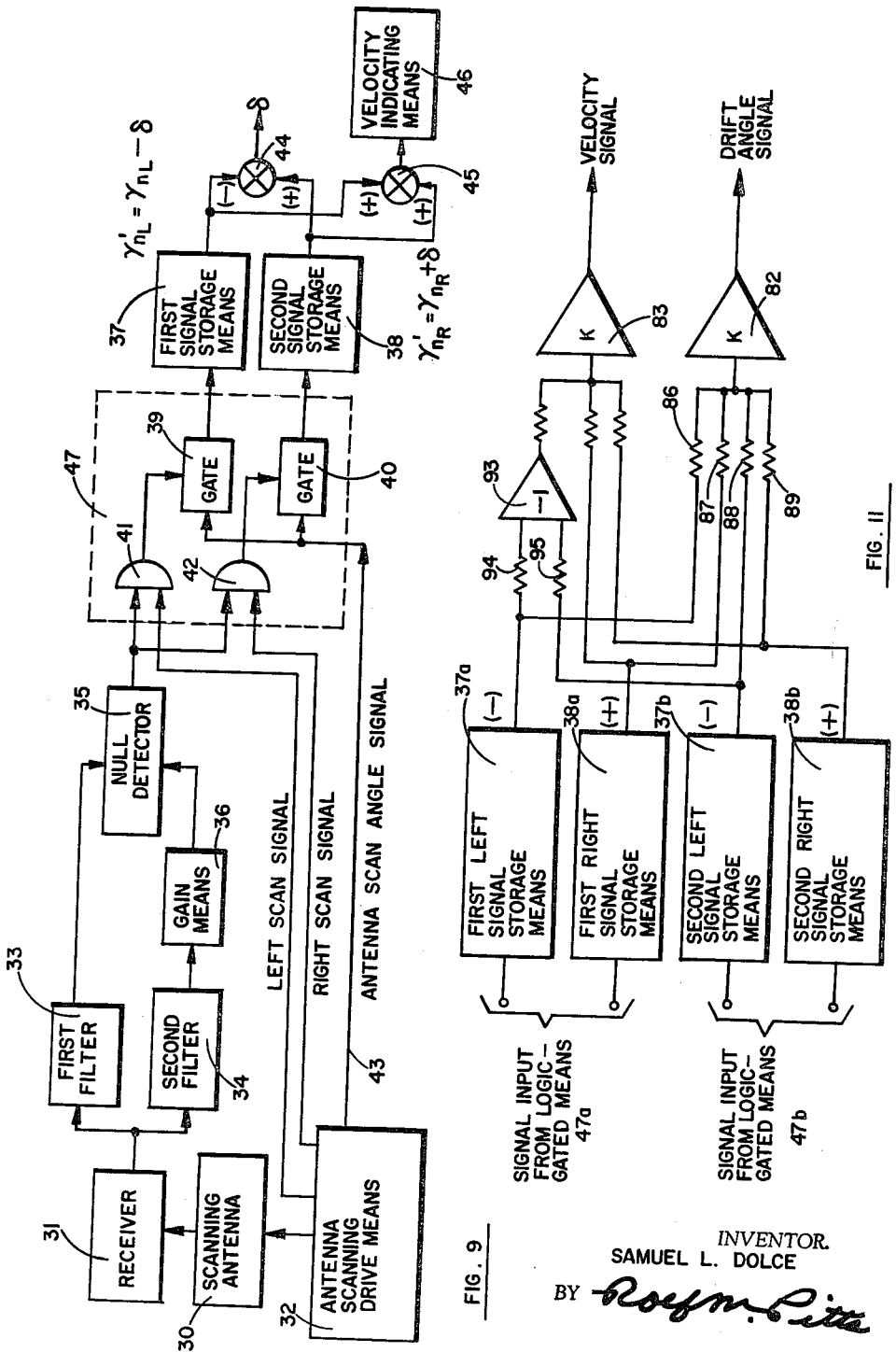
FIG. 9 is a functional block diagram of a system employing the concept of the invention.

Referring to FIG. 9 there is illustrated a block diagram of a radar receiver system employing the concept of the invention. There is provided a downward-looking directional scanning antenna 30 responsively coupled to an antenna scanning drive means 32. A receiver-amplifier 31 is responsively coupled to antenna 30 to detect and amplify the spectral content of the reflections of the energy radiated by an associated transmitter (not shown). The construction of such receiver-amplifier 31, scanning antenna 30, and scanning drive means 32 are well known in the art, and may be of any type suitable for cooperating with an associated transmitter. Accordingly, such elements are shown in block diagram form only. A first and second narrow band-pass filter 33 and 34 are responsively connected to the output of receiver to provide a first and second output signal, respectively, which is indicative of a mutually exclusive one of two separate frequencies contained within the spectra of the received energy detected by receiver 31. A null detector 35 is responsively connected to the output of each of filters 33 and 34 for providing an output signal indicative of a null condition between, or a common amplitude of, the inputs thereto from filters 33 and 34. Gain changing means 36 is interposed between filter 34 and null detector 35. Such gain means may be comprised of an amplifier for raising the general gain level of the output of second filter 34, where filter 34 has a higher tuned frequency relative to that of first filter 33, or else gain means 36 may be comprised of an attenuating network or potentiometer where second filter 34 has a lower tuned frequency than that of first filter 33, whereby a predetermined gain relationship is maintained between the inputs to the null detector 36. Accordingly, gain means 36 is shown in block form only.

As the scanning antenna 30 scans from the FRL to the left and back again, (during the scanning cycle), the null detector continuously compares the amplitudes of the outputs from first filter 33 and gain means 36 to determine the instant at which a null occurs. Such instant, corresponding to a given left side antenna cross-over angle, $\gamma'_{nL}$ is seen to be independent of the backscattering coefficient of the energy-reflecting medium or terrestrial surface. Similarly, as the antenna scans from the FRL to the right and back again, the cross-over angle, $\gamma'_{nR}$ may be seen to be independent of the backscattering coefficient. If the coefficient is high, the output from both filters 33 and 34 will be similarly increased. If the backscattering coefficient is low, the output from both filters will be correspondingly low. But the common or cross-over angle (on one side of the antenna FRL) at which the amplitudes are equal is not a function of the backscattering coefficient. Accordingly, if an aircraft mounting the system is flying above a shoreline such that the sea return on one hand exhibits a backscattering coefficient markedly different from the one for the dry land or terrain on the other hand, such difference will not significantly affect the system performance. The reasons for such insensitivity to difference in backscattering coefficient within the sector of scan are that (1) the spectra within a single common scanned beam are compared; (2) the beam being subjected to a single type of backscattering coefficient as a function of time (corresponding to different sectors of the field of scan), concurrently affects the gain of all spectral components of the single beam similarly. Hence, no gain differential occurs between the spectral component pair being compared. Such phenomenon is to be distinguished from prior art devices in which several fixed antenna beams are employed at mutually distinct orientations and compared, where a difference in backscattering coefficient over the field of surveillance causes gain differences between the several beams, resulting in system errors.

In addition to driving directional antenna 30, drive means 32 provides output signals indicative of the instantaneous antenna look-angle $\gamma$, including outputs indicative of whether the antenna is scanning to the left or right of the FRL ($\gamma=0$). Where the drive means cooperates with the antenna in closed-loop fashion, requiring the inclusion of an antenna angle pickoff element or the like, such structural feature of the antenna drive may be employed to provide an output signal indicative of the antenna angle $\gamma$; otherwise a pickoff element such as a potentiometer may be especially provided for such function. The left and right scan signal outputs may be provided by cam-driven switches operated by cams mounted on the output drive shaft of the antenna drive means, or by other suitable means well known to those skilled in the art for obtaining a signal indicative of an angular sector or range of angular positions in a rotary positional system.

There is further provided first and second signal storage means 37 and 38 responsively connected to the antenna angle signal output from drive means 32 for storing a signal indicative of a left and right antenna cross-over angle, $\gamma'_{nL}$ and $\gamma'_{nR}$ respectively, each angle being indicative of the occurrence of a null amplitude difference between the several inputs to null detector 35. Each of storage means 37 and 38 are similarly constructed and may be comprised, for example, of a peak voltage detector, and zero-order hold circuit or other means well known in the art for storing sampled electrical signals. Logic-gated means 47 is interposed between signal storage means 37 and 38 and the antenna angle signal output from drive means 32 to provide means of measuring the angles $\gamma'_{nL}$ and $\gamma'_{nR}$. There is provided a first and second signal gating means 39 and 40 interposed at the input to first and second storage means 37 and 38 respectively. Each such gating means may be comprised of an electronic switch, for example, or a relay having an armature and switching contact in series with the input to an associated one of storage means 37 and 38, and a magnetizing coil responsively connected to an associated one of AND gates 39 and 40. First gating means 39 is responsively connected to a first AND gate 41, and second signal gating means 40 is responsively connected to a second AND gate 42. First AND gate 39 is responsively connected to the left scan signal output of drive means 32 and output of null detector 35, whereby first AND gate 41 causes first signal gating means 39 to allow the antenna angle signal output on line 43 to be transmitted to first storage means 37 during the occurrence of a left side cross-over look-angle $\gamma'_{nL}$. In other words, when a null amplitude difference occurs between the several inputs to null detector 35 during antenna scanning to the left of $\gamma=0$, then a signal corresponding to the angle $\gamma'_{nL}$ at which such null occurs is stored in first storage means 37. Similarly, second AND gate 42 is responsively connected to the right scan signal output of drive means 32 and the output of null detector 35, whereby second AND gate 42 causes second signal gating means 40 to allow the antenna signal output on line 43 to be transmitted to second storage means 38 during the occurrence of a right side cross-over look angle, $\gamma'_{nR}$.

AND gates 41 and 42 may be comprised of any means well known in the art for providing an output signal during the coincidence of two input signal conditions.

There is also provided drift angle indicating means comprising storage signal difference deriving means 44 responsively connected to each of storage means 37 and 38 for providing an output indicative of the amplitude difference between the signals stored therein. If the antenna forward reference line (FRL for $\gamma=0$) were oriented parallel to the forward velocity vector component of a vehicle mounting such antenna, then the difference between the amplitudes of the several inputs to signal comparator 44 would be zero, corresponding to a zero drift angle. However, where the antenna forward reference line is not oriented parallel to the velocity vector because of drift, then (1) the antenna cross-over look-angles $\gamma'_L$ and $\gamma'_R$ for a given velocity vary by the amount of the drift angle, and (2) the difference between $\gamma'_{nL}$ and $\gamma'_{nR}$ is indicative of the drift angle $\delta$.

$$\gamma'_{nL}=\gamma_{nL}-\delta \qquad (2)$$

$$\gamma'_{nR}=\gamma_{nR}+\delta \qquad (3)$$

$$\gamma'_{nR}-\gamma'_{nL}=\gamma_{nR}-\gamma_{nL}+2\delta=2\delta \qquad (4)$$

where:

$\gamma'_{nL}$, $\gamma'_{nR}$=left and right cross-over antenna angle, respectively, relative to the antenna FRL($\gamma=0$).

$\gamma_{nR}=\gamma_{nL}=\gamma_n$=the antenna cross-over angle magnitude, measured relative to the vehicle forward velocity vector.

$\delta$=drift angle or difference between the FRL and the forward velocity vector in the plane of the antenna angle, $\gamma$.

Hence, it is to be seen that the output signal from comparator 44 is indicative of the drift angle $\delta$.

There is further provided storage signal summing means 45 responsively connected to each of storage means 37 and 38 for providing an output signal indicative of the sum of the amplitudes of the signals stored therein. Such output signal may be seen to be indicative of the antenna cross-over angle measured relative to the vehicle velocity vector (e.g., $\gamma_{nL}=\gamma_{nR}$), employing the relationships of Equations 1 and 2:

$$\gamma'_{nR}+\gamma'_{nL}=\gamma_{nR}+\gamma_{nL}+\delta-\delta=2\delta_n \qquad (5)$$

A voltmeter 46 with a suitable non-linear readout scale, mechanizing the relationship of Doppler velocity to look-angle $\delta_n$ (as illustrated in FIG. 6) may be connected to summing means 45 to provide a velocity indicator.

Accordingly, it is to be appreciated that an exemplary system is provided in FIG. 9 for mechanizing a concept of the invention.

Due to the random-appearing or statistical nature of the spectral content of the reflected energy detected by receiver 31, the signal data for a given sampled frequency (e.g., the output from an associated one of filters 33 and 34) may be somewhat noisy, demonstrating occasional amplitude spikes. Hence, error may arise in a given piece of the indicated antenna look-angle data for which an amplitude cross-over is observed between a predetermined pair of frequencies. However, it is unlikely that such a spike would occur at the same instant (or corresponding look-angle) for another spectral component. Accordingly, the effects of such noise on the data accuracy may be reduced by employing several different pairs of spectra frequencies as data sources, and averaging the resultant data, as shown in FIG. 10.

Figure 10:
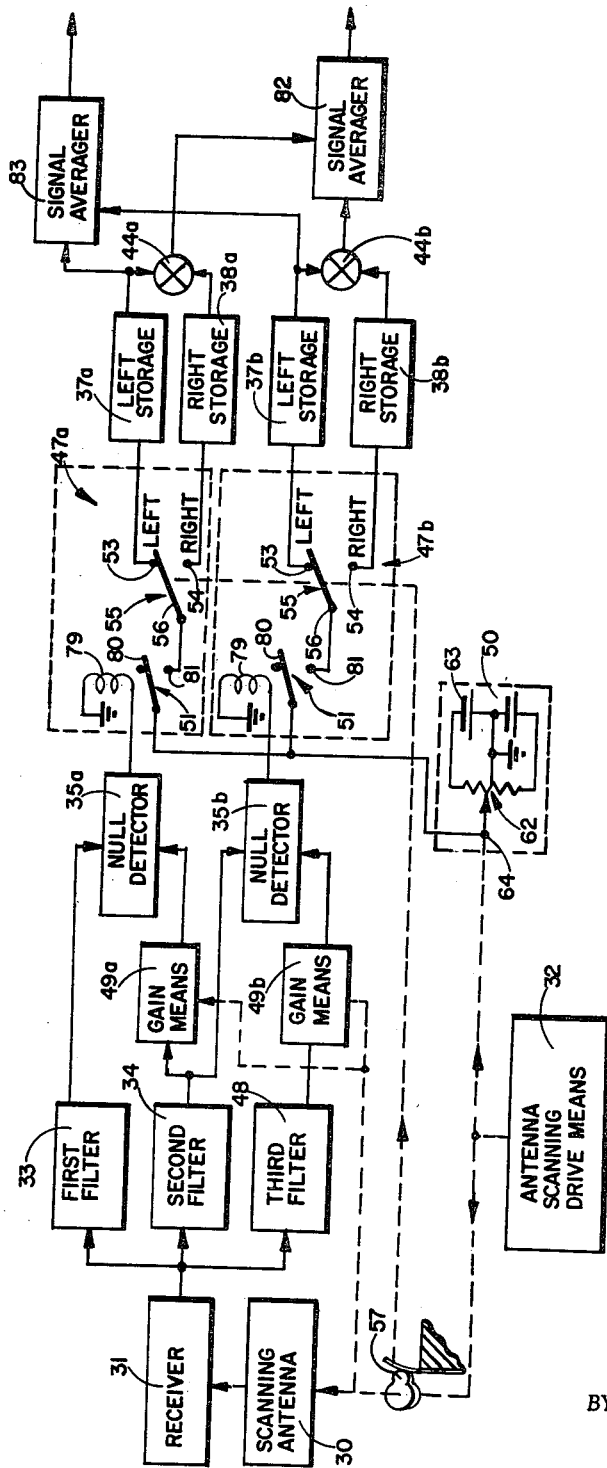
FIG. 10 is a functional block diagram of a preferred mechanization of the concept of FIG. 9.

Referring to FIG. 10 there is illustrated an exemplary mechanization partially in block form, of an alternate embodiment of the invention. There is provided a directional scanning antenna 30, a receiver 31, and an antenna scanning drive means 32, all constructed and arranged substantially similar to like referenced elements of FIG. 9. There is further provided a plurality of narrow bandpass filters 33, 34, and 48 each responsively connected to the output of receiver 31 for distinguishing mutually distinct frequencies contained within the spectra of the received energy detected by receiver 31. Filters 33 and 34 correspond to a first pair of filters, and filters 34 and 48 correspond to a second pair of filters. It is to be understood, however, that three mutually exclusive pairs of filters exist in the three filters shown (e.g., first pair of filters 33 and 34, second pair 34 and 48, and third pair 48 and 33). The use of four filters would similarly provide six mutually exclusive pairs of filters while five filters would provide eleven pairs of filters, and so forth.

A null detector is responsively connected to the outputs of a mutually exclusive one of each of the pairs of filters employed. For purposes of illustration, only two such detectors are shown in cooperation with two corresponding pairs of filters. A first null detector 35a is responsively connected to the outputs of first and second filters 33 and 34 and a second null detector 35b is responsively connected to the outputs of second and third filters 34 and 48.

Interposed between each of null detectors 35a and 35b and a respective input thereto are gain changing means 49a and 49b respectively for varying the gain of such input in predetermined relation to the other input to null detectors 35a and 35b respectively, whereby cross-over amplitudes are affected at various antenna look-angles corresponding to a Doppler velocity, as was explained in connection with element 36 of FIG. 9. Gain changing means 49a and 49b are comprised of adjustable non-linear gain elements such as function potentiometers responsively connected to antenna scanning drive 32 for providing a common, linear response of cross-over look-angles versus velocity for the two filter pairs illustrated. The design criterion for such gain elements is determined by the method discussed above in connection with FIGS. 7 and 8. In this way, the data from the several pairs of filters may be combined to affect data averaging, as will be more fully explained hereinafter.

There is further provided a signal generator 50 responsively coupled to scanning drive means 32 for generating a signal indicative of antenna look-angle magnitude and sense. Such signal generator 50 is comprised of a centertapped potentiometer 62 connected across a centertapped battery 63, the centertap terminals of the potentiometer and battery being commonly connected to a first output or common ground terminal of a two-terminal output. Wiper 64 of potentiometer 62 is mechanically connected to the mechanical output of scanning means 32 and provides the second output terminal of the two terminal output of signal generator 50.

The output of signal generator 50 is fed to a first and second pair of data storage means, the first pair being comprised of first left and first right signal storage means 37a and 38a, the second pair being comprised of second left and second right signal storage means. Interposed between each such pair of signal storage means is a corresponding logic-gated means 47a and 47b responsively connected to null detector 35a and 35b respectively for gating the input from the look-angle signal generator 50 to the associated signal storage means pair.

Each of logic-gated means 47a and 47b is comprised of a relay 51 and a double-throw switch 55 connected to gate the input to the left and right storage means respectively of a pair of storage means. Each of relays 51 comprises an arming coil 79, an armature 80 (shown in FIG. 10 in the energized position) and a contact 81. The arming coils 79 of respective relays 51 of logic-gated means 47a and 47b are connected to null detectors 35a and 35b respectively. The armatures 80 of relays 51 are commonly connected to the output of signal generator 50.

During normal operation of each of null detectors 35a and 35b, the arming coil 79 of an associated one of relays 51 is energized, thereby holding armature 80 in the energized position as shown in FIG. 10. Whenever a null occurs at the output of such null detector (corresponding to the occurrence of a cross-over look-angle), the associated relay is de-energized, and the armature is released to the de-energized position, thereby engaging electrical contact 81. Hence, a signal from generator 50, indicative of antenna look-angle, appears at terminal 81 only upon de-energization of a relay 51. Since such de-energization is made to occur for the instant or interval of cross-over, the antenna look-angle signal so transmitted to terminal 81 is indicative of a cross-over look-angle.

Contact 81 of each of relays 51 is electrically connected to an armature 56 of associated double-throw switch 55. The armature 56 of switch 55 of each of logic gated means 47a and 47b are commonly connected to and mechanically driven by means of cam 57 mounted on the output of antenna drive means 32. The shape and orientation of cam 57 is selected to drive switch armature 56 to one or the other of switch contacts 53 and 54, as a function of the sense of the antenna look-angle $\gamma$ relative to the FRL ($\gamma=0$). For example, when the antenna is scanning to the left of the FRL each switch armature 56 is driven into electrical contact with an associated switch contact 53; and when the antenna is scanning to the right of the FRL, switch armature 56 is driven into electrical contact with associated switch contact 54.

First left and first right signal storage means 37a and 38a are responsively connected to first and second terminals 53 and 54 respectively of switch 55 associated with first logic gated means 47a. Second left and second right signal storage means 37b and 38b are responsively connected to first and second terminals 53 and 54 of switch 55 associated with second logic-gated means 47b. Hence, it is to be appreciated that logic-gated means 47a causes signal storage means 37a and 38a to store signals indicative of left and right antenna cross-over angles respectively, associated with the inputs to null detector 35a; and logic-gated means 47b causes signal storage means 37b and 38b to store signals indicative of left and right cross-over angles respectively, associated with the inputs to null detector 35b.

There is also provided in FIG. 10 a drift angle indicating means comprising a first storage signal difference deriving means 44a responsively connected to each of signal storage means 37a and 38a, a second storage signal difference deriving means 44b responsively connected to each of signal storage means 37b and 38b, and signal averager 82. Each of difference deriving means 44a and 44b of FIG. 10 are similarly constructed and arranged as difference deriving means 44 of FIG. 9 for providing a signal output indicative of the difference between the two inputs thereto. Signal averager 82 may be comprised of a summing amplifier or other means well known in the art for summing a plurality of signals, whereby the output is indicative of the average of the input thereto. In this way, a spurious signal component in any one of the drift angle signal sources is attenuated in its effect on the total drift signal output.

There is further provided velocity indicating signal means comprising a second signal averager 83 responsively connected to the outputs of storage means 37a, 38a, 37b and 38b in order to provide a signal indicative of the sum of the magnitude left and right cross-over angles. Such sum is indicative of the average cross-over look-angle measured relative to the velocity vector, as indicated by Equation 4. Accordingly, such signal may be employed to obtain an indication of the Doppler velocity in the manner described in connection with the velocity signal output of FIG. 9.

It is to be observed from the mechanization of the antenna look-angle signal generator of FIG. 10, that the left look-angle signals are of opposite sense or polarity relative to the right look-angle signals. Hence, the left cross-over look angle ($\gamma'_{n_L}$) signals stored by elements 37a and 37b are of opposite sense to the right cross-over look-angle ($\gamma'_{n_R}$) signals stored by elements 38a and 38b. Accordingly, the mechanization of the drift angle signal means and velocity signal means of FIG. 10 can be achieved by a relatively simple and straightforward mechanization of elements 44a, 44b, 82 and 83 as shown in FIG. 11.

Referring to FIG. 11, there is illustrated an alternative mechanization of the drift angle signal means and velocity signal means of FIG. 10. There is provided signal storage means 37a, 38a, 37b and 38b constructed and arranged similarly as like referenced elements of FIG. 8, whereby signal storage elements 37a and 37b provide cross-over look-angle signals of a negative sense or polarity while signal storage elements 38a and 38b provide cross-over look-angle signals of positive sense or polarity. Hence, the direct summation of left cross-over angle signals of a common polarity or sense, and right cross-over look-angle signals having a common polarity opposite to that of the left cross-over look-angle signals at a summing amplifier 82 by means of a summing resistor network provides an output signal from amplifier 82 which is indicative of the drift angle. Such summing network is provided by summing resistors 86, 87, 88 and 89, each having one of its two terminals commonly connected to the input to summing amplifier 82. The other terminal of each resistors 86, 87, 88 and 89 is responsively connected in electrical circuit to the respective output of signal storage means 37a, 38a, 37b and 38b.

There is further provided in FIG. 11 velocity signal indicating means comprising summing amplifier 83 and summing means for summing look-angle signals of common polarity or sense in order to provide a signal indicative of Doppler velocity. Such summing means is comprised of summing resistors 90 and 91, each having one of its two terminals commonly connected to the input to summing amplifier 83. The other terminal of each of summing resistors 90 and 91 is responsively connected in electrical circuit to an output of signal storage means 38a and 38b respectively, for the reason that such signal storage means provides output signals having a common polarity or sense.

If it is desired to achieve further signal averaging of the velocity signal, by using the output of storage means 37a and 37b (providing output signals of a common polarity or sense opposed to that of storage means 38a and 38b), such signals may be so employed by first summing them at the input of a sense-inverting amplifier, as illustrated in FIG. 11 by invertor-amplifier 93 and summing resistors 94 and 95 interposed between the input to amplifier 93 and the output from storage means 37a and 37b respectively. The output of the summed and inverted input to amplifier 93 is then fed to velocity signal amplifier 83 by means of summing resistor 96.

Hence it is to be appreciated that the device of the invention comprises signal receiver means in cooperation with a single downward-looking scanning antenna for providing signals indicative of Doppler velocity and drift angle. Accordingly, the invention provides improved radio navigation apparatus the performance of which is substantially independent of back-scattering coefficient.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In a radio navigation system having a transmitter, a receiver, a downward-looking directional antenna and antnena azimuth scanning means for causing said antenna to sca to the right and left sides of an azimuth reference, the combination comprising: at least one pair of filters responsively connected to said receiver for distinguishing two mutually distinct frequencies contained within the spectra of an output of said receiver; comparison means responsively connected to said filters for comparing the amplitudes of the outputs of said filters; adjustable gain means in series with one of said filters and responsively connected to said antenna scanning means for normalizing the gain of one filter relative to the other as a function of antenna look-angle; velocity signal generating means responsively connected to said comparison means and said scanning means for providing a signal indicative of a Doppler velocity, and drift angle signal generating means responsively connected to said comparison means and said scanning means for providing a signal indicative of the drift angle of said Doppler velocity.

2. An improved radio navigation system for sensing electromagnetic radiation comprising: a receiver of reflections of said electromagnetic radiation, a single downward-looking directional antenna cooperating with said receiver for providing directivity to said received energy, scanning means in driving relation with said directional antenna for providing cyclical scanning of the direction of such directivity, at least one pair of filters for distinguishing at least two predetermined and mutually distinct frequencies contained within the spectra of said received energy, said filters being responsively coupled to said receiver, comparison means responsively connected to said filters for comparing the amplitudes of the outputs of said filters, velocity signal generating means responsive to said comparison means and said scanning means for providing a signal indicative of a Doppler velocity, and drift angle signal generating means responsive to said comparison means and said scanning means for providing a signal indicative of component direction of said Doppler velocity.

3. An improved sensing system for sensing electromagnetic radiation comprising: a single common source of reflections of said electromagnetic radiation; a single downward-looking directional antenna cooperating with said receiver for providing directivity to said transmitted and received energy; scanning means in driving relation with said directional antenna for providing cyclical scanning of the direction of such directivity; at least one pair of filters for distinguishing at least two mutually distinct frequencies contained within the spectra of said received energy, each of said filters having an output, said filters being responsively coupled to said receiver; comparison means responsively connected to said filters for comparing the amplitudes of the outputs of said filters; gain normalizing means interposed in series between the output of said receiver and an input of said comparison means for maintaining a predetermined gain relationship between the inputs to said comparison means; velocity indicating means responsive to said comparison means and said scanning means for indicating a Doppler velocity as a function of a common coincident amplitude input to said comparison means; and drift angle indicating means responsive to said comparison means and said scanning means for indicating a component direction of said Doppler velocity as a function of a common coincident amplitude input to said comparison means.

4. In a radio navigation system having a transmitter, downward-looking directional antenna and antenna azimuth scanning means for causing said antenna to scan to the right and left sides of an azimuth reference, the combination comprising: a common receiver connected to said antenna and having an output; a first and second filter each responsively connected to said receiver for distinguishing two mutually distinct component frequencies contained within the spectra of the output of said receiver; comparison means responsively connected to said filters for providing a signal indicative of a null amplitude difference between the inputs to said comparison means; gain normalizing means interposed between said receiver and an input to said comparison means for providing a predetermined gain relationship between the inputs to said comparison means; signal generator means responsively connected to said antenna scanning means for generating a signal indicative of antenna look-angle; first signal means responsively connected to said comparison means, said scanning means and said signal generator for providing a first signal indicative of antenna cross-over look-angles occurring to the left of said azimuth reference; second signal means responsively connected to said comparison means, said scanning means and said signal generator for providing a second signal indicative of antenna cross-over look-angles occurring to the right of said azimuth reference; drift angle deriving means responsive to said first and second cross-over look-angle signals for providing a signal indicative of the amplitude difference therebetween; and, velocity signal deriving means responsive to said first and second cross-over look-angle signals for providing a signal indicative of the amplitude sum thereof.

5. In a Doppler navigation system having a transmitter, downward-looking directional antenna and antenna azimuth scanning means for causing said antenna to scan to the right and left sides of an azimuth reference, the combination comprising: a single common receiver connected to said antenna and having an output; a first and second filter each responsively connected to said receiver for distinguishing two mutually distinct component frequencies contained within the spectra of the output of said receiver; comparison means responsively connected to said filters for providing a signal indicative of a null amplitude difference between the inputs to said comparison means; gain normalizing means interposed between said receiver and an input to said comparison means for providing a predetermined gain relationship between the inputs to said comparison means; signal generator means responsively connected to said antenna scanning means for generating a signal indicative of antenna look-angle; first and second signal storage means being responsively connected to said signal generator means; logic-gating means interposed between said signal generator signal means and said first and second signal storage means, said gating means being responsively connected to said comparison means and said scanning means for gating the inputs to said signal storage means; difference signal deriving means responsively connected to said first and second signal storage means for providing a signal indicative of Doppler drift angle; and, signal summing means responsively connected to said storage means for providing a signal indicative of Doppler velocity.

6. The device of claim 5 in which said logic-gating means comprises: first AND gate means responsive to said comparison means and a first sense of said antenna look-angle for providing a control signal; first signal-gating means interposed between said signal generator means and said first signal storage means and responsive to said control signal for transmitting inputs to said first storage signal means indicative of antenna cross-over look-angles of a first given sense, second AND gate means responsive to said comparison means and a second sense of said antenna look-angle for providing a control signal; second signal-gating means interposed between said signal generator means and said second signal storage means and responsive to said control signal for transmitting inputs to said second signal storage means indicative of antenna cross-over look-angles of a second sense.

7. In a Doppler navigation system having a transmitter, a receiver, downward-looking directional antenna and antenna azimuth scanning means for causing said antenna to scan to the right and left sides of an azimuth reference, the combination comprising: a plurality of pairs of narrow bandpass filters responsively connected to said receiver, the filters of each pair having mutually exclusive bandpass bandwidths; a plurality of null detectors corresponding to said pairs of filters, each null detector being responsively connected to a corresponding pair of filters for providing a signal indicative of a null amplitude difference between the outputs of said filters; adjustable gain means interposed in series circuits between said receiver and an input of each said null detector, and responsively connected to said antenna scanning means for maintaining a predetermined gain relationship between the inputs to each said null detector; each said gain changing means and null detector cooperating with an associated filter pair to provide a common amplitude cross-over look-angle characteristic as a function of velocity; signal generator means responsively connected to said antenna scanning means for generating a signal indicative of antenna look-angle; a plurality of pairs of signal means corresponding to said pairs of filters, each said pair being responsively connected to said signal generator said scanning means and a corresponding one of said null detectors, a first and second one of said pair of signal means being arranged to provide signals indicative of antenna cross-over look-occurring to the left and right respectively of said azimuth reference; drift angle deriving means responsive to said first and second cross-over look-angles for providing a signal indicative of the sum of amplitude differences therebetween; velocity signal deriving means responsive to said first and second cross-over look-angle signals for providing a signal indicative of the amplitude sum thereof.

8. The device of claim 7 in which said adjustable gain means cooperates with said antenna scanning means to adjust said gain relationship as a function of antenna look-angle.

9. In a radio navigation system having a transmitter, a receiver, a downward-looking directional antenna and antenna azimuth scanning means for causing said antenna to scan to the right and left sides of a reference azimuth, the combination comprising: a first and second filter having an output each responsively connected to said receiver for distinguishing two mutually distinct frequency spectra contained within the spectra of an output of said receiver; a null detector responsively connected to said filters for providing a null signal indicative of a null difference between the outputs of said filters; gain adjusting means in series with one of said filters for normalizing the gain of one filter relative to the other; signal generator means responsively connected to said antenna scanning means for providing a signal indicative of antenna look-angle; first and second signal storage means responsively connected to said function generator means for storing antenna look-angle signals; left and right gating means responsively connected to said null detector and said antenna scanning means, and interposed between said signal generator and said first and second signal storage means respectively in response to said null signal when said antenna is scanning to the left and right respectively of said reference azimuth; amplitude comparison means responsively connected to said first and second storage means for providing a signal indicative of drift angle; and amplitude summing means responsively connected to said first and second storage means for providing a signal indicative of drift angle.

10. The device of claim 9 in which said gating means is comprised of a normally-on switching relay and a double-throw switch, an armature of said switch being mechanically connected in driven relationship to said scanning means and electrically connected to said signal generator; a first and second switch contact of said switch corresponding to a first and second position respectively of said armature and being electrically connected to said first and second signal storage means respectively; said first and second positions of said armature corresponding to antenna look-angles to the right and left sides respectively of said reference azimuth; said relay being comprised of an arming coil responsively connected to said null detector, and an armature and normally-on switch contact interposed in series circuit between said signal generator and said armature of said switch.

11. In a navigation system having a transmitter, downward-looking directional antenna, scanning means for causing said antenna to scan to the left and right of an azimuth reference, and a single receiver responsively connected to such antenna, the combination comprising: a signal generator responsive to said scanning means for providing a signal indicative of antenna look-angle, first and second signal storage means responsive to said generator for storing signals indicative of left and right antenna look-angles respectively, filter means for distinguishing two mutually distinct component frequencies contained within the spectra of the output of said receiver, gain adjusting means for providing a predetermined gain relationship between said component frequency outputs of said receiver, null amplitude detection means responsive to the amplitudes of said two gain-adjusted component outputs for providing a first control signal when the amplitudes of said component outputs are equal, look-angle sense detecting means for providing an output indicative of a right and left sense of antenna look-angle, first signal gating means interposed between said signal generator and said first signal storage means, second signal gating means interposed between said signal generator and said second signal storage means, said first signal gating means being responsive to the coincidence of said first control signal and the right sense of said antenna look-angle, said second signal gating means being responsive to the coincidence of said first control signal and the left sense of said antenna look-angle, and comparison means responsive to the amplitude difference between said first and second signal storage means for providing a signal indicative of drift angle, and output signal means including at least one of said signal storage means for providing a signal indicative of velocity.

No references cited.

UNITED STATES PATENT OFFICE
CERTIFICATE OF CORRECTION

Patent No. 3,135,956                                                   June 2, 1964

Samuel L. Dolce

It is hereby certified that error appears in the above numbered patent requiring correction and that the said Letters Patent should read as corrected below.

Column 1, line 11, for "ssytems" read -- systems --; line 20, for "becons" read -- beacons --; same column 1, line 28, for "scaler" read -- scalar --; column 8, line 67, for "$\delta_n$" read -- $\gamma_n$ --; column 12, lines 11 and 12, for "antnena" read -- antenna --; line 13, for "sca" read -- scan --.

Signed and sealed this 23rd day of November 1965.

(SEAL)
Attest:

ERNEST W. SWIDER
Attesting Officer

EDWARD J. BRENNER
Commissioner of Patents